3,470,127
ELECTRICAL INSULATING TAPE PREPARED FROM AN ETHYLENE-PROPYLENE COPOLYMER COMPOSITION
Robert B. Snell, White Bear Lake, and Charles R. Freeman, St. Paul, Minn., assignors to Minnesota Mining and Manufacturing Company, St. Paul, Minn., a corporation of Delaware
No Drawing. Filed July 6, 1965, Ser. No. 469,873
Int. Cl. C08f 47/14, 29/12
U.S. Cl. 260—33.6         9 Claims

ABSTRACT OF THE DISCLOSURE

Self-fusing electrical insulating tape comprising an ethylene-propylene elastomer, a tackifier, and either a thermoplastic resin selected from polyethylene and polypropylene or a curing agent; in some embodiments an elastomer based on isobutylene, a plasticizer, and fillers, including electrically conductive fillers, are also included.

---

This invention provides a self-adhering or self-fusing electrical insulation composition, particularly in tape form, having high resistance to environmental and exposure conditions.

Self-fusing electrical insulation tapes, which typically are formed from stretchable, elastic, high-dielectric strength compositions based on unvulcanized or partially vulcanized rubber and smoothly calendered to a thickness of approximately 20 to 40 mils, usually 30 mils, have been extremely useful in providing an easily applied, essentially homogeneous insulation sheath over splices or terminations of electrical conductors. The tapes have been used on a variety of electrical wires and cables, ranging from house wiring to overhead and underground cables carrying up to 100,000 volts.

A need that arose immediately with the introduction of the first commercial, natural rubber-based tapes was improvement in the resistance of the tapes to environmental conditions. The short useful life of these tapes, with the periodic replacement they required in numerous, scattered, and often out-of-the-way locations, inhibited their application. Synthetic elastomers were then used as the rubbery base for self-fusing electrical insulation tapes and over the years substantial improvement has been made in giving the tapes increased resistance to most temperature, moisture, and oxidation conditions.

However, a major, continuing problem has been the susceptibility of the tapes to damage by the ultraviolet component of sunlight. Depending on the particular conditions of exposure, prior art tapes wrapped on a conductor in outdoor job applications have exhibited stress-cracking, sometimes after a time as short as a few hours. This cracking is principally attributable to the degradation of the tape that arises from destruction by light energy of carbon-carbon bonds within the tape components. As a result of the stress-cracking, the insulation sheath is left mechanically weakened and dielectrically inferior, and subject to early ultimate failure.

The tape product of the present invention is the first satisfactory self-fusing electrical insulation tape, to our knowledge, to give consistently good resistance to ultraviolet exposure. This new tape endures indefinitely under conditions of ultraviolet exposure that degrade prior art self-bonding tapes. The tape further has superior resistance to outdoor weathering in general, including resistance to high temperature environments, oil and oil-like solvent vapors, and ozone-filled atmospheres. As a result the novel tape may be applied in repair and installation applications with confidence of long life. In addition to its improved resistance characteristics, the novel tape product exhibits good tensile strength, elongation, and handleability properties, good dielectric properties, and good self-adhesion properties so that overlapped wrappings on a conductor fuse to a homogeneous sheath.

In general, these superior properties are obtained with an insulating tape composition that comprises the following proportions by weight:

(a) about 100 parts elastomer, including about 15–100 parts of an elastomer having a polymer unit based principally on ethylene and propylene, the balance being an elastomer based principally on isobutylene;
(b) up to about 50 parts of polyethylene or polypropylene;
(c) between about 5 and 75 parts of compatible tackifiers for the elastomers;
(d) up to about 50 parts of compatible plasticizers for the elastomers;
(e) up to about 125 parts fillers; and
(f) up to about 15 parts of a curing agent for the elastomers.

In addition, minor amounts of additives including small amounts of other compatible rubbers and resins may be included to enhance or add particular properties.

Elastomers based on polymers of ethylene and propylene are a principal component of the novel tape. It has been found that ethylene-propylene elastomers provide a tough, resistant rubbery base to which the other components noted hereinafter may be added to give tapes having high chemical stability and resistance to environmental conditions. Tapes of this invention having good properties may be formed of a composition in which the sole elastomeric component is an ethylene-propylene elastomer. Either copolymers of ethylene and propylene or terpolymers that include in addition a minor percentage of a nonconjugated diene such as dicyclopentadiene have been found useful. The terpolymers are preferred inasmuch as tapes in which they are a principal elastomer exhibit superior tensile strength and elongation properties. Ethylene and propylene are typically included in approximately equal weight amounts in the useful ethylene-propylene elastomers, ethylene comprising about 30–70 weight percent, and preferably 40–60 weight percent, of these elastomers, for example. The higher molecular weight ethylene-propylene elastomers are somewhat more preferred because of their greater physical strength.

Tapes of this invention with the best properties of fusibility and elasticity also include an elastomer based on isobutylene, such as butyl rubber or polyisobutylene. The inclusion of approximately equal weight percentages of ethylene-propylene and isobutylene elastomers have been found to give the best overall balance of properties. However, satisfactory tapes can be produced with the two elastomers present in a range of proportions. A rather surprisingly low amount of ethylene-propylene elastomer substantially increases the resistance of the tape to exposure conditions. When about 15 weight percent of the elastomers are ethylene-propylene rubbers a satisfactory resistance to exposure conditions including ultraviolet radiation, oil- and ozone-filled atmospheres, and other conditions of outdoor weathering results; about 25 weight percent of the elastomers or more, however, is a preferred amount of ethylene-propylene rubber because of the high exposure resistance of the elastomer and the increased tensile strength it gives the tape. On the other hand, for the properties of fusibility, elasticity, and smoothness to exist to the preferred extent, the elastomers in the formulation should include at least about 25 weight percent of an elastomer based on isobutylene.

The tape composition of this invention is given added tensile strength, body, and handleability, and adapted to easier processing by the inclusion, preferably, of a thermoplastic resin such as polyethylene or polypropylene. As an alternative to providing the needed mechanical properties with a thermoplastic resin, these properties can be given the composition by a partial vulcanization produced through the incorporation of small amounts (about one to 15 weight percent based on the elastomers) of a curing agent such as Dicup T (dicumyl peroxide), Elastopar (a nitrosoamine) or polymethylol phenol (CKR 1634 Bakelite). Vulcanization of the composition is less preferred, however, because the tape has poorer properties of fusibility and poorer handleability. Reinforcing fillers can also be used to strengthen the tape.

The strengthening effect of polyethylene or polypropylene is associated with a preferred tape product occurs with amounts of more than about 10 weight percent of the elastomeric components. Above about 50 weight percent of the elastomers, on the other hand, the increased strength provided by one of these resins is outbalanced by decreased fusibility and elongation properties. Polyethylene, particularly high molecular weight polyethylene, is found to give the best results. The best results with polypropylene are achieved when it is added in smaller amounts, as about 15 weight percent based on the elastomers.

One or more resinous tackifiers chosen on the basis of their compatibility with and effectiveness in tackifying the principal elastomeric components should be included in the tape composition to provide good self-adhering properties. Useful tackifiers will occur to those skilled in the art, but we have found such commercially available tackifiers as Staybelite ester #10 (a glyceryl ester of hydrogenated rosin), Piccolyte resin #S-85 (a thermoplastic, terpene resin), and Piccopale resin #100 (a petroleum hydrocarbon resin) to suitably tackify the elastomers when added in moderate amounts. The most useful self-adhering insulating tapes are produced with tackifiers included in the tap composition in an amount between about 5 and 75 weight percent of the elastomers, but the desirable amount of tackifier may vary somewhat with its effectiveness.

Plasticizers and softeners compatible with the elastomers also are preferably included in the tape composition to improve the flow and stretch characteristics of the composition as well as to ease processing of the tape. While satisfactory tapes may be produced without plasticizers, the best properties occur with about 25 weight percent of plasticizer based on the elastomers, and preferably not less than about 10 weight percent, while more than about 50 weight percent tends to make the tape too soft and stretchy. We have usefully employed such plasticizers as Aroclor 1254 (a chlorinated polyphenol resin) and Sunthene 2100 oil (a naphthenic rubber process oil) and Stanolind oil (a paraffin oil). Fillers such as soft clay, diatomaceous silica, and inorganic oxide may also be included, and for reasons of economy are, up to about 125 weight percent based on the elastomers. In certain formulations reinforcing fillers are desirable to strengthen and make more handleable the tape product. Carbon black is usually included to color the tape.

Minor amounts (up to about 20 parts by weight based on the elastomers) of various additives may also be included in the compositions of the invention to enhance particular properties or add certain characteristics. For example, lubricants such as a low melting polyethylene or stearic acid and flame retardants such as particulate polyvinyl chloride resin together with antimony trioxide may be included. Acetylene carbon black may be added to produce semi-insulative tapes useful in providing an insulation sheath in which the voltage gradient is spread across the whole width of the sheath.

The invention will be more fully illustrated by the following examples. Examples 1 and 5 describe preferred compositions. However, it will be understood that compositions nearly as useful as the preferred compositions can be prepared with formulations in which the proportions are slightly modified.

EXAMPLE 1

A tape composition was prepared using the following ingredients and proportions:

| | Grams |
|---|---|
| Ethylene - propylene - diene terpolymer having a Mooney value of 70 (Nordel 1070) | 233 |
| Butyl rubber that includes about 1–1.4 mol percent isoprene (Enjay Butyl #165) | 233 |
| High molecular weight polyethylene having a molecular weight of about 150,000 weight average, a nominal melt index (by ASTM D1238–57T) of 0.6 ($I_2$ at 190° C.), and a density of 0.945 (Hi-Fax 1400) | 108 |
| Hard, brittle, solid, glyceryl ester of hydrogenated rosin having a specific gravity of 1.08 and a melting point of 85° C. (Staybelite ester #10) | 80 |
| Thermoplastic terpene resin (Piccolyte resin #S–85) | 37 |
| Chlorinated polyphenyl resin comprising about 54 weight percent chlorine (Arochlor 1254) | 117 |
| Carbon black (Spheron #9) | 37 |
| Diatomaceous earth (Celite 1070) | 287 |

The ethylene-propylene-diene terpolymer was placed on a two-roll mill and broken down, after which the butyl rubber was added and the two milled together into a mixture. The polyethylene was then added to the batch and, while steam at a temperature between 270° and 330° F. was applied, the batch cut back and forth until smooth. The hydrogenated rosin ester, the terpene resin, the chlorinated polyphenyl resin, the carbon black, and the diatomaceous earth were next separately mixed together and then added to the rubber-thermoplastic combination. The combined mixtures were then cut back and forth for approximately 15 minutes under the application again of steam having a temperature between 270° and 330° F. The final mixture was fed through a four-roll, inverted L calender, with the top two rolls being heated to about 310° F., the center roll to about 305° F., and the lower roll to about 175° F. Tape was calendered to a thickness of about 0.032 inch, and then slit into ¾ inch widths.

To test ultraviolet resistance, the tape was wrapped at an elongation of 400 percent or more on a 15/16 inch diameter cardboard tube to a thickness of ⅛ inch and subjected to a General Electric UA–11 bulb at a distance of 20 inches for 8 hours. Under these accelerated conditions for testing resistance to stress-cracking, no effect on the tape was detected. The tape was subjected to an atmosphere containing 0.015 volume percent ozone while wrapped on a test core at a 300 percent elongation, and showed no damage. Tapes of this example when aged for 24 hours at 250° F. became slightly soft, but showed no tendency to crack. Tapes were stretched and wrapped on test cores and immersed in cable oil at room temperature; after over a month the tape had softened somewhat but had not cracked or unwrapped from the core. When stretched until its thickness was 12 mils, the tape exhibited a dry dielectric strength of 960 volts/mil and a wet dielectric strength of 1050 volts/mil. In testing tensile properties, the test equipment was set to stretch the tape at an elongation rate of 12 inches/minute. The yield strength was found to be 363 pounds/square inch. The percent elongation at the yield point was 30 percent and at break was 2800 percent. Tape wrapped in overlapping layers on a tube at an elongation of 300 percent could barely be unwound without tearing after one hour and after seven hours the layers could not be separated intact.

EXAMPLES 2A–2E

The tapes of Examples 2A–2E were prepared by modifying the proportions and kind of elastomeric component in the basic formulation set out in Example 1. In Example 2A, 350 grams of butyl rubber (Enjay Butyl #165) and 116 grams of ethylene-propylene-diene-terpolymer (Nordel 1070) were used instead of the proportions shown in Example 1. In Example 2B the rubber component consisted only of 466 grams of ethylene-propylene-diene terpolymer (Nordel 1070) and no butyl. The tape of Example 2C included 233 grams of butyl rubber (Enjay Butyl #268) in which the mol percentage of isoprene was 1.5–2.0, higher than in the butyl rubber of Example 1, as well as 233 grams of ethylene-propylene-diene terpolymer (Nordel 1070). In Example 2D, 233 grams of polyisobutylene (Vistanex L-120) replaced the butyl rubber. Lastly, in Example 2E tape was prepared using 233 grams of an ethylene-propylene copolymer that comprised between 40 and 46 weight percent ethylene and no unsaturation and had a Mooney viscosity value of between 35 and 45 (EPR-404) instead of the ethylene-propylene-diene terpolymer of Example 1.

All of these tapes exhibited a high resistance to ultraviolet exposure, to attack by oils, and to an atmosphere containing ozone, and showed no tendency to crack in the presence of heat. The tapes all had satisfactory self-fusing properties. The other properties of the tapes are shown in the table.

TABLE

| Example | Dielectric strength, volts/mil | | Yield strength, p.s.i. | Tensile strength at break. p.s.i. | Percent elongation | |
|---|---|---|---|---|---|---|
| | Dry | Wet | | | Yield | Break |
| 2A | 975 | 1,080 | 379 | 340 | 28 | 1,100 |
| 2B | 1,250 | 570 | 444 | 323 | 25 | 2,789 |
| 2C | 1,080 | 830 | 376 | 307 | 18 | 2,448 |
| 2D | 1,250 | 1,220 | 459 | 464 | 50 | 3,192 |
| 2E | 1,080 | 720 | 345 | 226 | 17 | 896 |

EXAMPLE 3

A tape was prepared by substantially the same procedure as Example 1 using the following formulation:

|   | Grams |
|---|---|
| Ethylene-propylene rubber (EPR-404) | 100 |
| A hard, brittle thermoplastic resin derived from pine wood and containing phenol, aldehyde, and ether groups (Vinsol resin) | 6 |
| Dicumyl peroxide (Dicup T) | 3 |
| Antimony trioxide (Oncor 23A) | 10 |
| Zinc oxide | 5 |
| Particulate polyvinyl chloride (Geon 121) | 10 |
| Polyethylene having a melting point of about 100° C. (AC Poly 617) | 1 |
| Talc (Mistron) | 50 |
| Carbon black (Gastex) | 10 |

The composition was calendered to a 30 mil film at 200° F. and then in a jumbo roll was heated approximately four hours at about 280° F. Modulus tests were run to test the efficiency of the core.

When stretched at 12 inches/minute, this tape exhibited a tensile strength at break of 297 pounds/square inch, and an elongation at break of 1520 percent. The tape had satisfactory properties of self-adhesion. It did not crack when heated for 20 minutes at 150° C. In relaxed sheets the tape was found to exhibit a dry dielectric strength of over 690 volts/ml. The tape was stretched and wrapped on test cores and subjected to long outdoor exposure, whereupon it was found to exhibit excellent resistance to exposure conditions, including sunlight.

EXAMPLE 4

The following formulation was formed into a tape using the procedure in Example 1.

|   | Grams |
|---|---|
| Ethylene-propylene-diene terpolymer (Nordel 1070) | 325 |
| Butyl rubber that includes about 1–1.4 mol percent isoprene (Enjay Butyl #165) | 425 |
| High-molecular weight polyethylene (Hi-Fax 1400) | 135 |
| Petroleum hydrocarbon tackifying resin (Piccopale resin #100) | 75 |
| Chlorinated polyphenyl resin comprising about 54 weight percent chloride (Aroclor 1254) | 100 |
| Naphthenic rubber process oil (Sunthene oil 2100) | 65 |
| Finely divided carbon black from natural gas (P-33) | 60 |
| Calcined clay (Glomax H.E. clay) | 300 |

Using the test procedures of Example 1, it was found that this tape had good ultraviolet and ozone resistance, good resistance to attack by oils, and softened rather than cracked when aged 24 hours at 250° F. The tape had dry and wet dielectric strengths of 1170 and 1300 volts/mil respectively, had a yield strength of 244 pounds/square inch, a tensile strength at break of greater than 320 pounds/square inch, and was elongated about 25 percent at the yield point and about 3200 percent at break. The tape showed good properties of self-adhesion.

EXAMPLE 5

A tape was prepared using the formulation and procedure of Example 1 except that naphthenic rubber process oil (Sunthene oil 2100) was substituted for Aroclor 1254 in the same proportion (117 grams). This tape had good ultraviolet, ozone, and oil resistance, had dry and wet dielectric strengths of 1440 and 820 volts/mil respectively, had a yield strength of 285 pounds/square inch and a tensile strength at break of greater than 369 pounds/square inch, and was elongated 20 percent at the yield point and 3200 percent at break. The tape fused satisfactorily and did not crack when aged for 24 hours at 250° F.

EXAMPLE 6

Using the procedure of Example 1, tape with a caliper of 31 mils was prepared from the following formulation:

|   | Parts by weight |
|---|---|
| Ethylene-propylene copolymer (EPR-404) | 300 |
| Butyl rubber that includes 0.6–1.0 mol percent iosprene (GR1-35) | 100 |
| Low molecular weight polyethylene having a molecular weight of 21,000 weight average (DYNH) | 75 |
| Thermoplastic terpene resin (Piccolyte resin #S-85) | 50 |
| Paraffin oil (Stanolind oil) | 75 |
| Diatomaceous earth (Celite 1070) | 250 |
| Carbon black (Spheron #9) | 50 |
| Antimony oxide | 20 |

The tape exhibited good resistance to ultraviolet light, ozone, immersion in oil, and high temperature. The tape had dry and wet dielectric strengths of about 860 and 870 volts/mil respectively. It had a yield strength of about 150 pounds/square inch and a tensile strength at break of about 155 pounds/square inch. The tape was elongated about 70 percent at the yield point and about 900 percent at break.

EXAMPLE 7

Tape was calendered to a thickness of about 34 mils using the procedures of Example 1 and the formulation below:

| | Parts by weight |
|---|---|
| Ethylene - propylene - diene terpolymer (Nordel 1070) | 300 |
| Highly crystalline, high-impact isotactic polypropylene having a melt flow index (by ASTM D1238–57T) of 4.0 ($I_2$ at 230° C.) (Pro-Fax 65A4) | 42 |
| Thermoplastic terpene resin (Piccolyte S-85) | 20 |
| Paraffin oil (Stanolind oil) | 70 |
| Diatomaceous earth (Celite 270) | 150 |
| Carbon black (P-33) | 30 |

This tape was tested and found to have satisfactory resistance to outdoor weathering conditions including ultraviolet light, ozone, immersion in oil, and high temperature. The tape exhibited dry and wet dielectric strengths of about 750 and 820 volts/mil respectively, a yield strength and tensile strength at break of about 115 and 100 pounds/square inch respectively, and an elongation of 70 percent at the yield point and of over 1700 percent at break.

What is claimed is:

1. A stretchable elastic self-supporting self-fusing electrical insulating tape resistant to environmental and exposure conditions including ultraviolet radiation, high temperature, and the presence of oils and oil-like solvents, and ozone, and prepared from the composition comprising in parts by weight
   (a) 100 parts of elastomer including at least 15 parts of an ethylene-propylene elastomer selected from the group consisting of EPM and EPDM elastomers the balance being an isobutylene elastomer selected from the group consisting of polyisobutylene and butyl rubber;
   (b) up to about 50 parts of a thermoplastic resin selected from polyethylene and polypropylene;
   (c) between about 5 and 75 parts of compatible tackifiers for the elastomers;
   (d) up to about 50 parts of compatible plasticizers for the elastomers;
   (e) up to about 125 parts fillers; and
   (f) up to about 15 parts of a curing agent for the elastomers;
   at least one of said thermoplastic resin and said curing agent being present to increase the strength, handleability, and processability of the composition, the minimum amount of resin when included being about 10 parts and the minimum amount of curing agent when included being about one part.

2. A stretchable elastic self-supporting self-fusing electrical insulating tape resistant to environmental and exposure conditions including ultraviolet radiation, high temperature, and the presence of oils and oil-like solvents, and ozone, and prepared from the composition comprising in parts by weight
   (a) 100 parts of elastomer including at least about 15 parts of an ethylene-propylene elastomer, the balance being an isobutylene elastomer;
   (b) between about 10 and 50 parts of a thermoplastic resin selected from polyethylene and polypropylene;
   (c) between about 5 and 75 parts of compatible tackifiers for the elastomers;
   (d) up to about 50 parts of compatible plasticizers for the elastomers; and
   (e) up to about 125 parts fillers.

3. A stretchable elastic self-supporting self-fusing electrical insulating tape resistant to environmental and exposure conditions including ultraviolet radiation, high temperature, and the presence of oils and oil-like solvents, and ozone, and prepared from the composition comprising in parts by weight
   (a) 100 parts of elastomer including between about 25 and 75 parts of an ethylene-propylene elastomer the balance being an isobutylene elastomer;
   (b) between about 10 and 50 parts of thermoplastic resin selected from polyethylene and polypropylene;
   (c) between about 5 and 75 parts of compatible tackifiers for the elastomers;
   (d) up to about 50 parts of compatible plasticizers for the elastomers; and
   (e) up to about 125 parts fillers.

4. A stretchable elastic self-fusing electrical insulating tape resistant to environmental and exposure conditions including ultraviolet radiation, high temperature, and the presence of oils and oil-like solvents, and ozone, and prepared from the composition comprising
   (a) 100 parts of an ethylene-propylene elastomer selected from the group consisting of EPM and EPDM elastomers;
   (b) between about 5 and 75 parts of compatible tackifiers for the elastomers;
   (c) up to about 50 parts of compatible plasticizers for the elastomers;
   (d) up to about 125 parts fillers; and
   (e) between about 1–15 parts of a curing agent for the elastomer.

5. The electrical insulating tape of claim 1 which includes fillers, at least a portion of which are electrically conductive.

6. The electrical insulating tape of claim 2 which includes fillers, at least a portion of which are electrically conductive.

7. The insulating tape of claim 2 wherein the ethylene-propylene elastomer is selected from the group consisting of EPM and EPDM elastomers and the isobutylene elastomers is selected from the group consisting of polyisobutylene and butyl rubber.

8. The insulating tape of claim 2 wherein
   (a) the ethylene-propylene elastomer is an EPDM elastomer and it is included in an amount between 25 and 75 parts;
   (b) the isobutylene elastomer is selected from polyisobutylene and butyl rubber; and
   (c) the thermoplastic resin is high-molecular-weight polyethylene.

9. The insulating tape of claim 2 wherein
   (a) the ethylene-propylene elastomer is an EPDM elastomer and it is included in an amount of about 50 parts;
   (b) the isobutylene elastomer is butyl rubber; and
   (c) about 25 parts of tackifier and about 25 parts of plasticizer are included.

References Cited

UNITED STATES PATENTS

| 2,484,060 | 10/1949 | Wing | 260—896 |
| 2,572,458 | 10/1951 | Eustis. | |
| 3,148,059 | 9/1964 | Brunson et al. | |
| 3,220,966 | 11/1965 | Flanagan. | |

OTHER REFERENCES

Amberg et al.: Rubber World, March 1963, pp. 52–59.

ALLAN LIEBERMAN, Primary Examiner

U.S. Cl. X.R.

260—23.5, 23.7, 27, 41, 41.5, 889, 897